United States Patent [19]

Nakagawa et al.

[11] Patent Number: 5,560,865
[45] Date of Patent: Oct. 1, 1996

[54] LIQUID CRYSTAL COMPOSITION

[75] Inventors: Etsuo Nakagawa; Shinichi Sawada, both of Chibaken, Japan

[73] Assignee: Chisso Corporation, Osaka, Japan

[21] Appl. No.: 435,652

[22] Filed: May 5, 1995

[30] Foreign Application Priority Data

May 6, 1994 [JP] Japan .................................. 6-117630
May 6, 1994 [JP] Japan .................................. 6-117631

[51] Int. Cl.$^6$ ........................ C09K 19/52; C09K 19/34; C09K 19/12; C09K 19/20
[52] U.S. Cl. ................. 252/299.01; 252/299.61; 252/299.63; 252/299.66; 252/299.67
[58] Field of Search ................. 252/299.01, 299.61, 252/299.63, 299.64, 299.65, 299.66, 299.67

[56] References Cited

U.S. PATENT DOCUMENTS

| | | | |
|---|---|---|---|
| 4,661,283 | 4/1987 | Sugimori et al. | 252/299.63 |
| 5,069,814 | 12/1991 | Suzuki et al. | 252/299.67 |

FOREIGN PATENT DOCUMENTS

| | | |
|---|---|---|
| 0155792 | 9/1985 | European Pat. Off. |
| 0393443 | 10/1990 | European Pat. Off. |
| 4028988 | 3/1992 | Germany |

OTHER PUBLICATIONS

Database WPI, Week 9249, Derwent Publications Ltd., London, GB; AN 92-403397 & JP-A-04 300 861 (Seimi Chem KK), 23 Oct. 1992.

*Primary Examiner*—Shean C. Wu
*Attorney, Agent, or Firm*—Wenderoth, Lind & Ponack

[57] ABSTRACT

A liquid crystal composition containing a first component (I), a second component ((II-1) or (II-2)), a third component ((III), (IV) or (V)), and a fourth component ((VI) or (VII)):

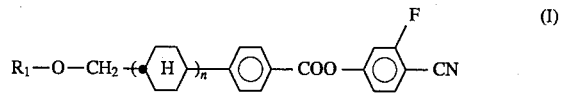

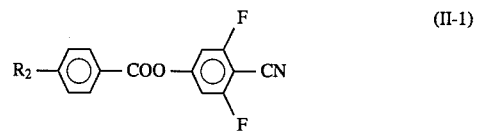

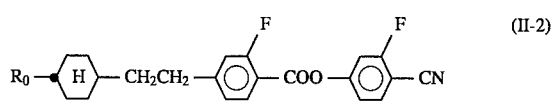

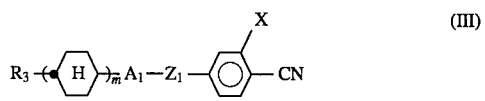

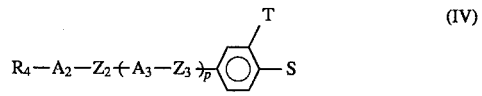

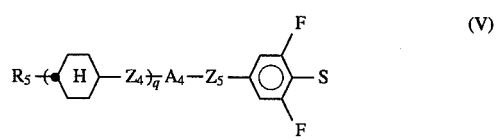

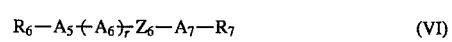

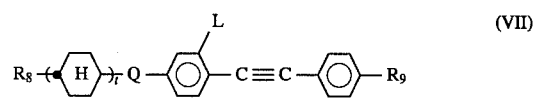

wherein the variables are defined in the specification.

13 Claims, No Drawings

LIQUID CRYSTAL COMPOSITION

BACKGROUND OF THE INVENTION

1. Field of the Invention

This invention relates to a liquid crystal composition for liquid crystal display. More particularly, it relates to a liquid crystal composition used in a display element employing TN (twisted nematic) mode or STN (supertwisted nematic) mode, and to a liquid crystal display element using the composition.

2. Description of the Related Art

At present, display elements utilizing liquid crystals have been broadly utilized for watches, electronic calculators, etc. These liquid crystal display elements utilize the optical anisotropy and dielectric anisotropy of liquid crystal substances. Liquid crystal phases include a nematic liquid crystal phase, a smectic liquid crystal phase and a cholesteric liquid crystal phase. Among these, display elements utilizing nematic liquid crystal phase have been most broadly practically used. Further, as display modes applied to liquid crystal display, TN (twisted nematic) mode, STN (supertwisted nematic) mode, DS (dynamic scattering) mode, guest-host mode, ECB (electrically controlled birefringence) mode, etc. are mentioned. A number of liquid crystalline compounds including those in research stage until now, have appeared, but at present, there is no substance filled in display elements as a single liquid crystal substance and used. This is because, liquid crystal substances expected as display element material are preferred to exhibit liquid crystal phases within a temperature range as broad as possible, including room temperature at which the element is most frequently used, and should be sufficiently stable for use under environment factors and have physical properties sufficient for driving display elements, but those satisfying these conditions as a single substance have not yet been found.

Thus, at present, several kinds of liquid crystal substances and further, non-liquid-crystalline substances are blended to prepare compositions having required characteristics, and they have been subjected to practical use as display materials.

These liquid crystal compositions are required to be stable to moisture, light, heat, air, etc. usually present in the environment wherein they are used, and also stable to electric field and magnetic field, and further, it is required that mixed liquid crystal compounds are chemically stable to each other, under use environment.

Further, liquid crystal compositions should have suitable optical anisotropy, dielectric anisotropy, viscosity and a mesomorphic phase temperature range, depending upon display modes and use applications of elements.

As currently, most generally used display modes, TN (twisted nematic) mode utilizing the optical activity of liquid crystal cells having a twisted angle of 90°, and STN (supertwisted nematic) mode utilizing the birefringent property of liquid crystal cells set to a twisted angle of 180° to 270° are mentioned.

For the liquid crystal display elements utilizing these modes, it has become important to reduce the threshold voltage in the electrooptical characteristics and the temperature-dependency of the threshold voltage.

Namely, when the threshold voltage is reduced, low voltage drive and low consumed electric power become possible, and when the temperature-dependency of the threshold voltage is reduced, inferior displays such as poor contrast, cross-talk, etc. within a temperature range used are inhibited.

However, according to the current technique, reduction in the threshold voltage brings about inferior temperature-dependency and notable increase in the viscosity. Further, reduction in the temperature-dependency brings about increase in the threshold voltage and reduction in the steepness of the electrooptical characteristic curve. Thus, sufficiently satisfactory compositions have been very few.

As described above, since various physical and chemical properties are required for the liquid crystal compositions utilized for display elements, it is not easy to prepare satisfactory liquid crystal materials; hence it is the present status that liquid crystal compositions sufficiently satisfying these conditions have been still earnestly desired.

SUMMARY OF THE INVENTION

The object of the present invention is to provide a liquid crystal composition having a suitable optical anisotropy, dielectric anisotropy, viscosity and mesomorphic range depending upon the use applications of display elements, and still yet having reduced the threshold voltage in electrooptical characteristics and the temperature-dependency of the threshold voltage.

The present invention has the following constitutions (1) and (2):

(1) A liquid crystal composition comprising a first component consisting of at least one member of compounds expressed by the formula (I):

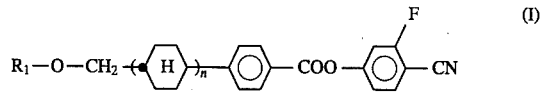

wherein $R_1$ represents an alkyl group of 1 to 8 carbon atoms and n represents 0 or 1;

a second component consisting of at least one member of compounds expressed by the formula (II-1) or the formula (II-2):

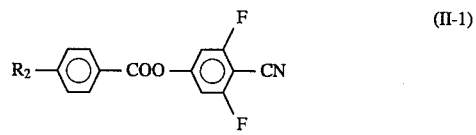

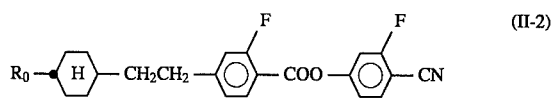

wherein $R_2$ represents an alkenyl group of 2 to 8 carbon atoms and $R_0$ represents an alkyl group of 1 to 8 carbon atoms;

a third component consisting of at least one member of compounds expressed by the formula (III), formula (IV) or formula (V):

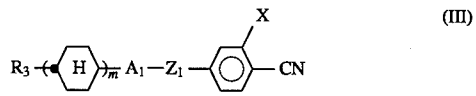

-continued

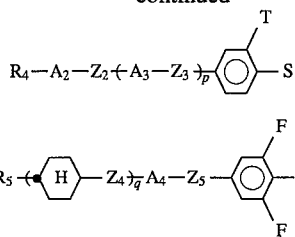

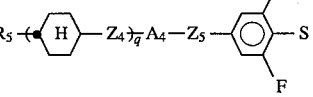

wherein, in the formula (III), $R_3$ represents an alkyl group of 1 to 8 carbon atoms, wherein one $CH_2$ group may be replaced by oxygen atom or —CH=CH— group; m represents 0 or 1; $A_1$ represents trans-1,4-cyclohexylene, 1,4-phenylene or trans-1,3-dioxan-2,5-diyl; $Z_1$ represents —COO— or a single bond; and X represents F or H, with a proviso that when $Z_1$ represents —COO—, X represents H, in the formula (IV), $R_4$ represents an alkyl group of 1 to 8 carbon atoms; p represents 0 or 1; $A_2$ represents trans-1,4-cyclohexylene, 1,4-phenylene or pyrimidin-2,5-diyl; $A_3$ represents trans-1,4-cyclohexylene or 1,4-phenylene; $Z_2$ represents —CH$_2$CH$_2$—, —CH=CH— or a single bond; $Z_3$ represents —COO— or a single bond; T represents F or H; S represents F or Cl, in the formula (V), $R_5$ represents an alkyl group of 1 to 8 carbon atoms; q represents 0 or 1; $A_4$ represents trans-1,4-cyclohexylene or 1,4-phenylene; $Z_4$ represents —CH$_2$CH$_2$—, —CH=CH— or single bond; $Z_5$ represents —CH$_2$H$_2$— or a single bond; and S represents F or Cl, and a fourth component consisting of at least one member of compounds expressed by the formulas (VI) or (VII):

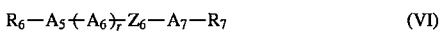

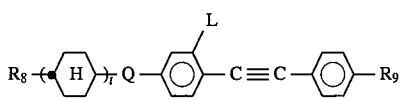

wherein, in the formula (VI), $R_6$ represents an alkyl group of 1 to 8 carbon atoms; $R_7$ represents an alkyl group or an alkoxy group each of 1 to 8 carbon atoms or an alkoxymethyl group of 2 to 8 carbon atoms; r represents 0 or 1; $A_5$ represents trans-1,4-cyclohexylene, 1,4-phenylene or pyrimidin-2,5-diyl; $A_6$ and $A_7$ each independently represent trans-1,4-cyclohexylene or 1,4-phenylene; and $Z_6$ represents —COO— or a single bond, and in the formula (VII), $R_8$ and $R_9$ represent an alkyl group of 1 to 8 carbon atoms; Q represents single bond or —CH$_2$CH$_2$—; L represents F or H; and t represents 0 or 1.

(2) A liquid crystal display element comprising the above-mentioned liquid crystal composition.

DETAILED DESCRIPTION OF THE INVENTION

In the present invention, when a compound of trans-1,3-dioxan-2,5-diyl as $A_1$ of the above formula (III) or a compound of pyrimidin-2,5-diyl as $A_2$ of the above formula (IV) is used as a compound of the third component, then compounds of $A_1$ or $A_2$ group expressed by the formulas mentioned below are preferably used.

Further, when a compound of pyrimidin-2,5-diyl as $A_5$ of the above formula (VI) is used as a compound of the fourth component, then a compound of $A_5$ group expressed by the formula mentioned below are preferably used.

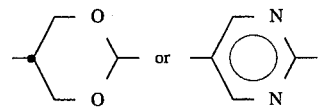

Compounds preferred as the first component of the liquid crystal composition of the present invention are those expressed by the following formula (Ia) and the formula (Ib):

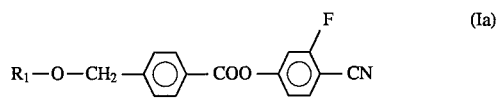

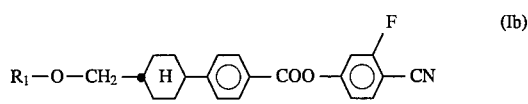

wherein $R_1$ represents an alkyl group of 1 to 8 carbon atoms. The preferable mixing proportion of the first component in the liquid crystal composition of the present invention is 3 to 50% by weight based upon the total weight of the first to fourth components, preferably 5 to 30% by weight based thereupon. If the mixing proportion of the first component is less than 3% by weight, this is undesired since aimed effects of reduction in the threshold voltage and reduction in its temperature-dependency may not be brought about. Further, if the mixing proportion of the first component exceeds 50%, this is also undesired since the viscosity of the resulting composition may become too high.

Preferable compounds as the second component are those expressed by the following formulas (II-1a), (II-1b) and (II-2):

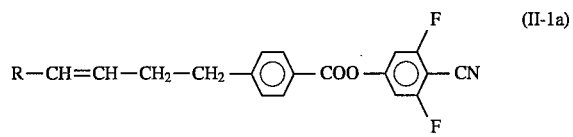

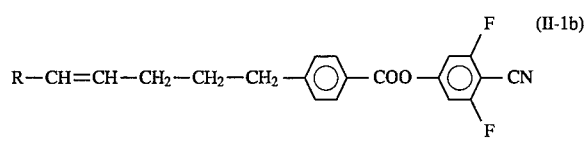

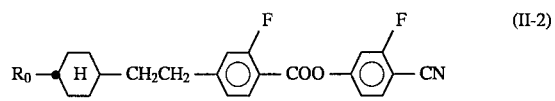

wherein

R represents hydrogen atom, an alkyl group or an alkoxy group, each of 1 to 8 carbon atoms, and $R_0$ represents an alkyl group of 1 to 8 carbon atoms.

The preferable mixing proportion of the second component in the liquid crystal composition of the present invention is 3 to 50% by weight based upon the total weight of the first to fourth components, preferably 5 to 30% by weight based thereupon. If the mixing proportion of the second component is less than 3% by weight, this is undesirable since reduction in the threshold voltage and reduction in its temperature-dependency are insufficient. If the mixing proportion exceeds 50% by weight, this is also undesired since the viscosity of the resulting composition is too high.

As described above, the compounds of the first component and the second component are those particularly effective for reducing the threshold voltage of the resulting liquid crystal composition and its temperature-dependency.

Preferable compounds expressed by the formula (III) among compounds of the third component are those expressed by either of the following formulas (IIIa) to (IIIh):

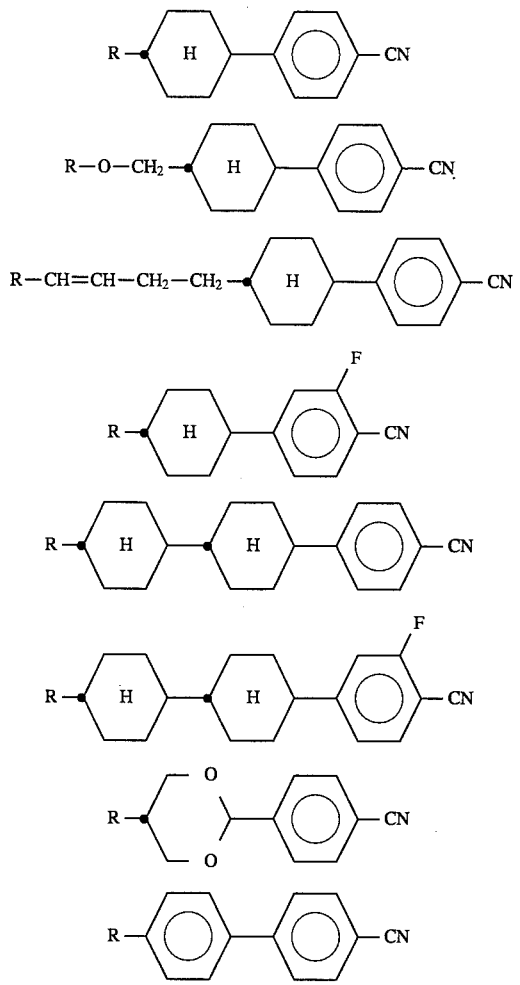

wherein

R represents an alkyl group of 1 to 8 carbon atoms, but R may be hydrogen atom only in the case of (IIIc). Preferable compounds as those of the formula (IV) in the third component are compounds expressed by either of the following formulas (IVa) to (IVo):

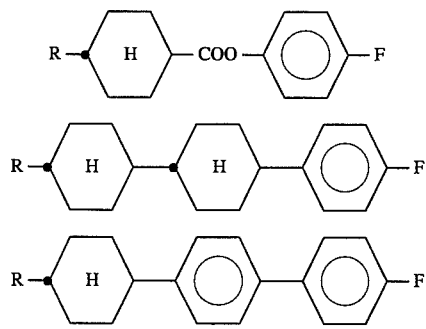

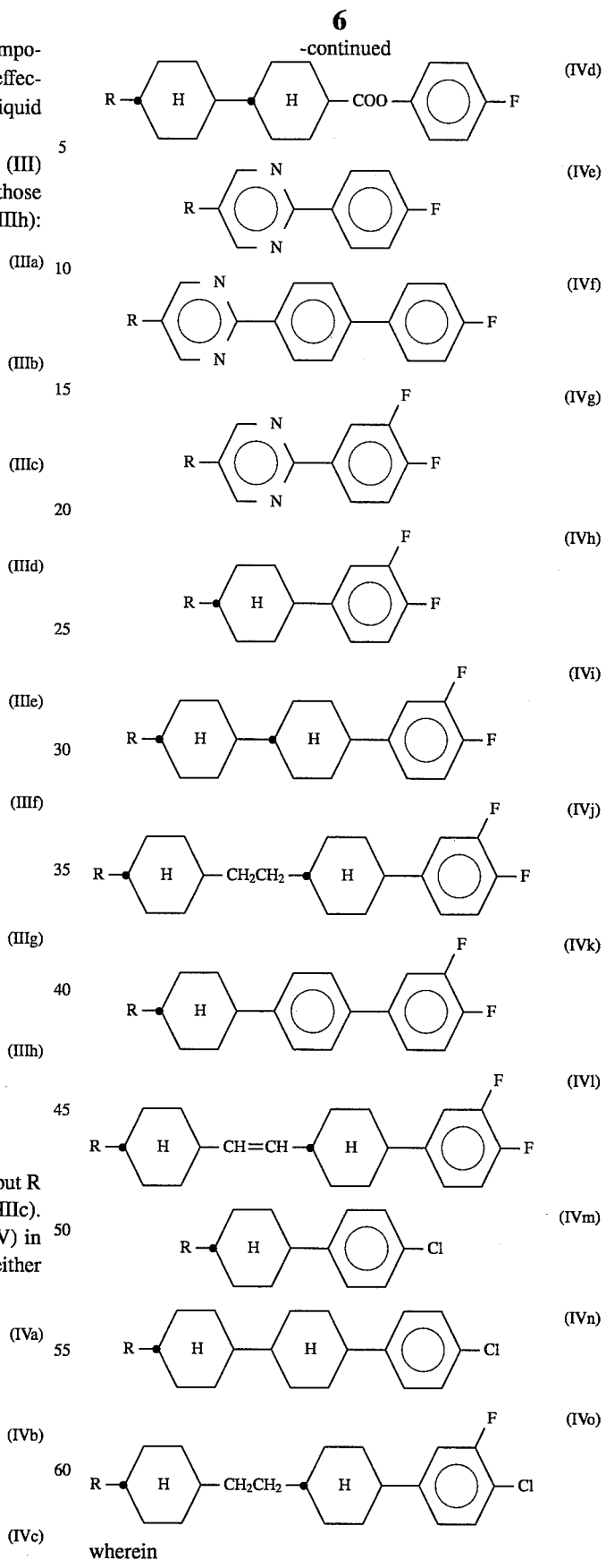

wherein

R represents an alkyl group of 1 to 8 carbon atoms. Among compounds of the third component, preferable compounds expressed by the formula (V) are those expressed by either of the following formulas (Va) to (Vg):

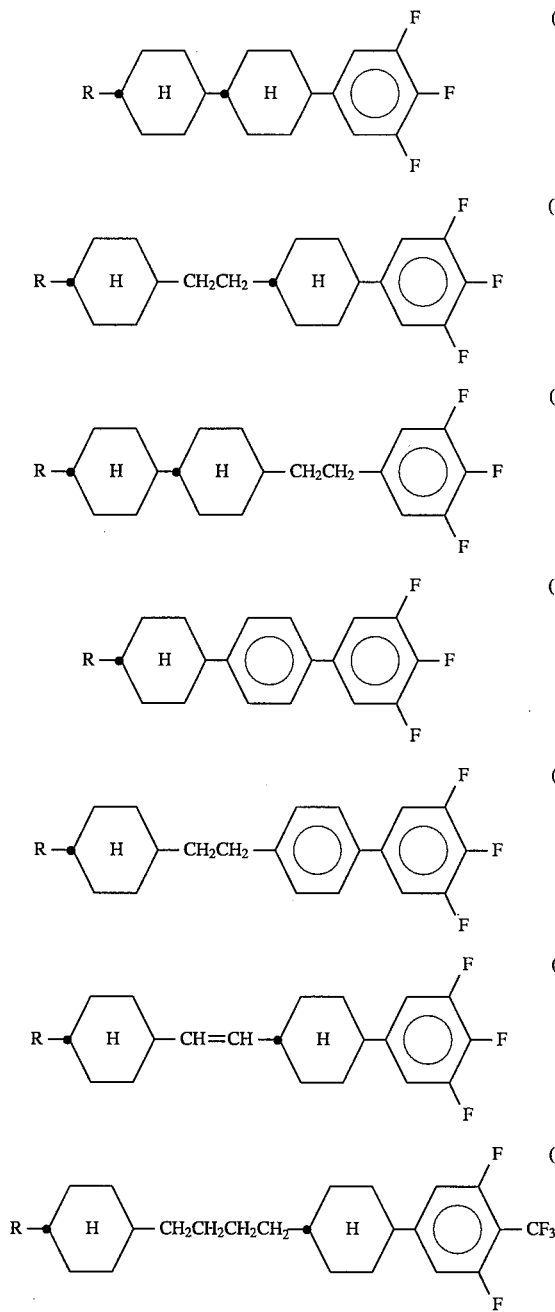

wherein

R represents an alkyl group of 1 to 8 carbon atoms.

These compounds of the third component have a comparatively large, positive dielectric anisotropy and are useful mainly for adjusting the threshold voltage of the resulting liquid crystal composition.

The preferable mixing proportion of the third component in the liquid crystal composition of the present invention is 10 to 50% by weight based upon the total weight of the first to fourth components, and the particularly preferable mixing proportion is 20 to 40% by weight.

If the mixing proportion of the third component is less than 10% by weight, this is undesirable since the threshold voltage may rise. If the mixing proportion exceeds 50% by weight, this is also undesirable since the viscosity of the resulting composition may be too high.

Preferable compounds as the fourth component are those expressed by either of the following formulas (VIa) to (VIb) and the formulas (VIIa) to (VIIc):

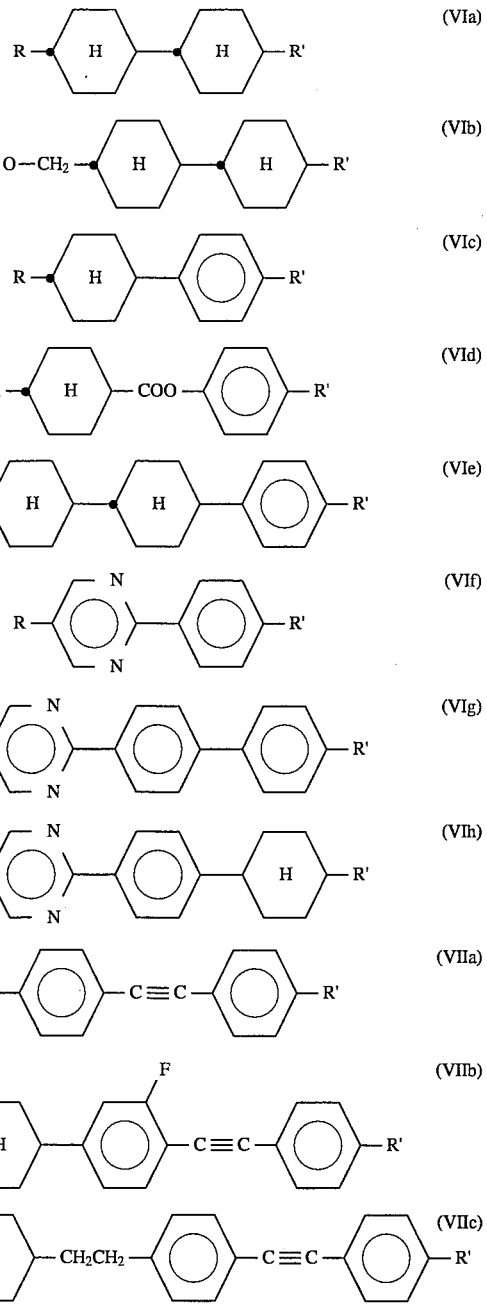

wherein

R represents an alkyl group of 1 to 8 carbon atoms and R' represents an alkyl group or an alkoxy group, each of 1 to 8 carbon atoms.

These compounds of the fourth component have a negative or weakly positive dielectric anisotropy and are used for adjusting the clearing point and viscosity, etc. of the resulting liquid crystal composition. The preferable mixing proportion of the fourth component in the liquid crystal composition of the present invention is 10 to 50% by weight based upon the total weight of the first to fourth components and particularly preferable mixing proportion is 20 to 40% by weight. If the mixing proportion of the fourth component is less than 10%, this is undesirable since the viscosity of the resulting composition may increase. Further, if the mixing proportion exceeds 50%, this is also undesirable since the threshold voltage may often increase.

As preferable embodiments of the present invention, composition or liquid crystal display element of the following items (1) to (4) can be mentioned:

(1) A liquid crystal composition comprising a first component consisting of at least one member of compounds chosen from the group consisting of compounds expressed by the above formulas (1a) or (1b);

a second component consisting of at least one member of compounds chosen from the group consisting of compounds expressed by the above formulas (II-1a), (II-1b) or (II-2), a third component consisting of at least one member of compounds chosen from the group consisting of compounds expressed by the above formulas (IIIa) to (IIIh), (IVa) to (IVo) or (Va) to (Vg); and a fourth component consisting of at least one member of compounds chosen from the group consisting of compounds expressed by the formulas (VIa) to (VIh) or (VIIa) to (VIIc).

(2) A liquid crystal composition according to the item (1), wherein the mixing proportions of the first component, the second component, the third component and the fourth component are respectively 3 to 50%, 3 to 50%, 10 to 50% and 10 to 50%, each based upon the total weight of these components.

(3) A liquid crystal composition according to the item (1), wherein the mixing proportions of the first component, the second component, the third component and the fourth component are respectively 5 to 30%, 5 to 30%, 20 to 40% and 20 to 40% by weight.

(4) A liquid crystal display device comprising a liquid crystal composition according to either one of the items (1) to (3).

The respective liquid crystal compounds expressed by the formulas (1) to (VII) in the present invention have been known or can be prepared according to the standard processes disclosed in literatures.

For example, the compounds of the formulas (Ia) and (Ib) are respectively disclosed in Japanese patent application laid-open Nos. Sho 60-184060 and Sho 61-33519, and the compounds of the formulas (II-1) and (II-2) are respectively disclosed in Japanese patent application laid-open Nos. Hei 4-300861 and Hei 2-229139. Further, the compounds of the formula (IIIa) are disclosed in Japanese patent application laid open Nos. Sho 58-10552 and Sho 59-152362 and the compounds of the formula (VIa) are disclosed in Japanese patent application laid-open Nos. Sho 59-70624 and Sho 60-16940, and the compounds of the formula (VIb) are disclosed in Japanese patent application laid-open No. Sho 58-167535 and the compounds of the formula (VIe) are disclosed in Japanese patent application laid-open No. Sho 57-165328.

The liquid crystal composition of the present invention is prepared according to a conventional process. Namely, various-necessary component compounds are dissolved in each other at a temperature higher than the clearing point thereof. Further, by adding a suitable additive to the liquid crystal material of the present invention, it is possible to improve the material so as to correspond to the aimed use applications. Such an additive is well known by a person of ordinary skill in the art and also disclosed in literatures. Usually, there are additives such as chiral dopant for inducing the helical structure of liquid crystals to thereby adjust necessary twist angle and prevent reverse twist of liquid crystal molecules.

Furthermore, by adding to the liquid crystal composition of the present invention, a dichroic dyestuff such as those of merocyanines, styryl derivatives, azo compounds, azomethines, azoxy compounds, quinophthalones, anthraquinones, tetrazine derivatives, etc., it is possible to use the composition as a liquid crystal composition for guest-host (GH) mode.

Further, it is also possible to use the liquid crystal composition of the present invention for NCAP prepared by micro-capsulating nematic liquid crystals, or polymer-dispersion type display element (PDLCD) represented by polymer net-work liquid crystal display element (PNLCD) having three-dimensional, reticulated high-molecule formed in liquid crystal. Besides, it is possible to use the liquid crystal composition as a liquid crystal material for electrically controlled birefringence (ECB) mode or dynamic scattering (DS) mode.

(EXAMPLE)

The present invention will be described in more detail by way of Examples and comparative examples, but it should not be construed to be limited thereto. In addition, in these examples, the voltage at which the brightness reached 10% of its saturated value is referred to as threshold voltage and expressed by $V_{10}$. Further, the temperature-dependency ($\delta$) of the threshold voltage is defined by the following equation (the measurement of the brightness in this case being carried out in the normal direction of the cell surface):

$$\delta = \frac{V_{10}(0°\ C.) - V_{10}(50°\ C.)}{[V_{10}(0°\ C.) + V_{10}(50°\ C.)]/2} \times \frac{100}{50°\ C. - 0°\ C.}\ (\%/°C.)$$

Comparative example 1

Commercially available nematic liquid crystal, ZLI-1132 (made by E. Merck) exhibits clearing point: 72.4° C.; viscosity at 20° C.: 27.0 mPa.s; optical anisotoropy at 25° C.: 0.137; and threshold voltage: 1.78 V; $\delta$=0.58 (%/°C.).

Example 1

A liquid crystal composition consisting of the following compounds was prepared:

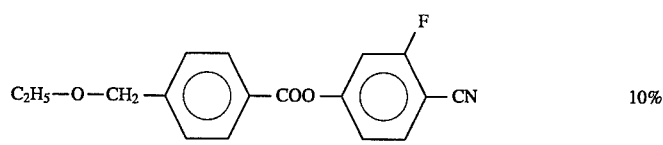

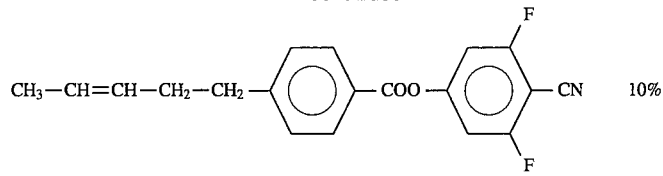  10%

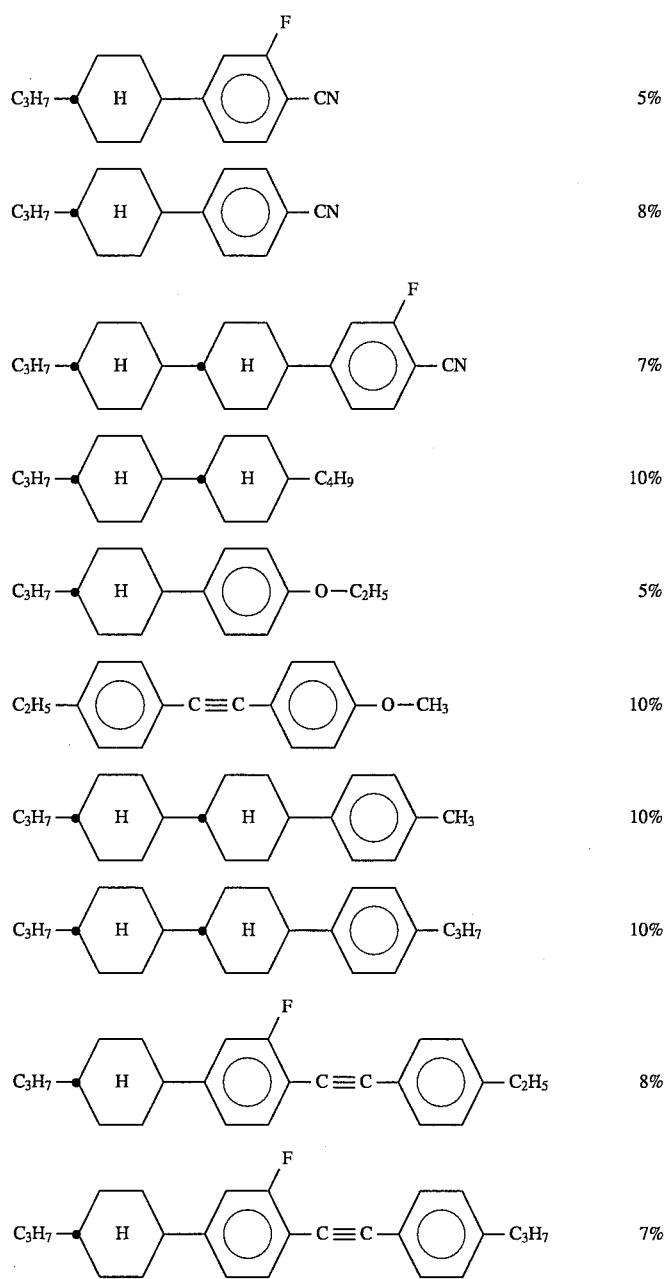

This liquid crystal composition exhibited clearing point: 88.3° C., viscosity at 20° C.: 22.6 mPa.s, optical anisotropy at 25° C.: 0.151, threshold voltage: 1.35 V, and δ=0.24 (%/°C.).

When this liquid crystal composition is compared with the liquid crystal material of Comparative example 1, the liquid crystal composition of Example 1 has a higher clearing point than that of the liquid crystal composition of Comparative example 1, and nevertheless, the viscosity, threshold voltage and δ are reduced; thus it can be said that the composition has superior properties as a liquid crystal composition for display device.

Example 2

A liquid crystal composition consisting of the following compounds was prepared:

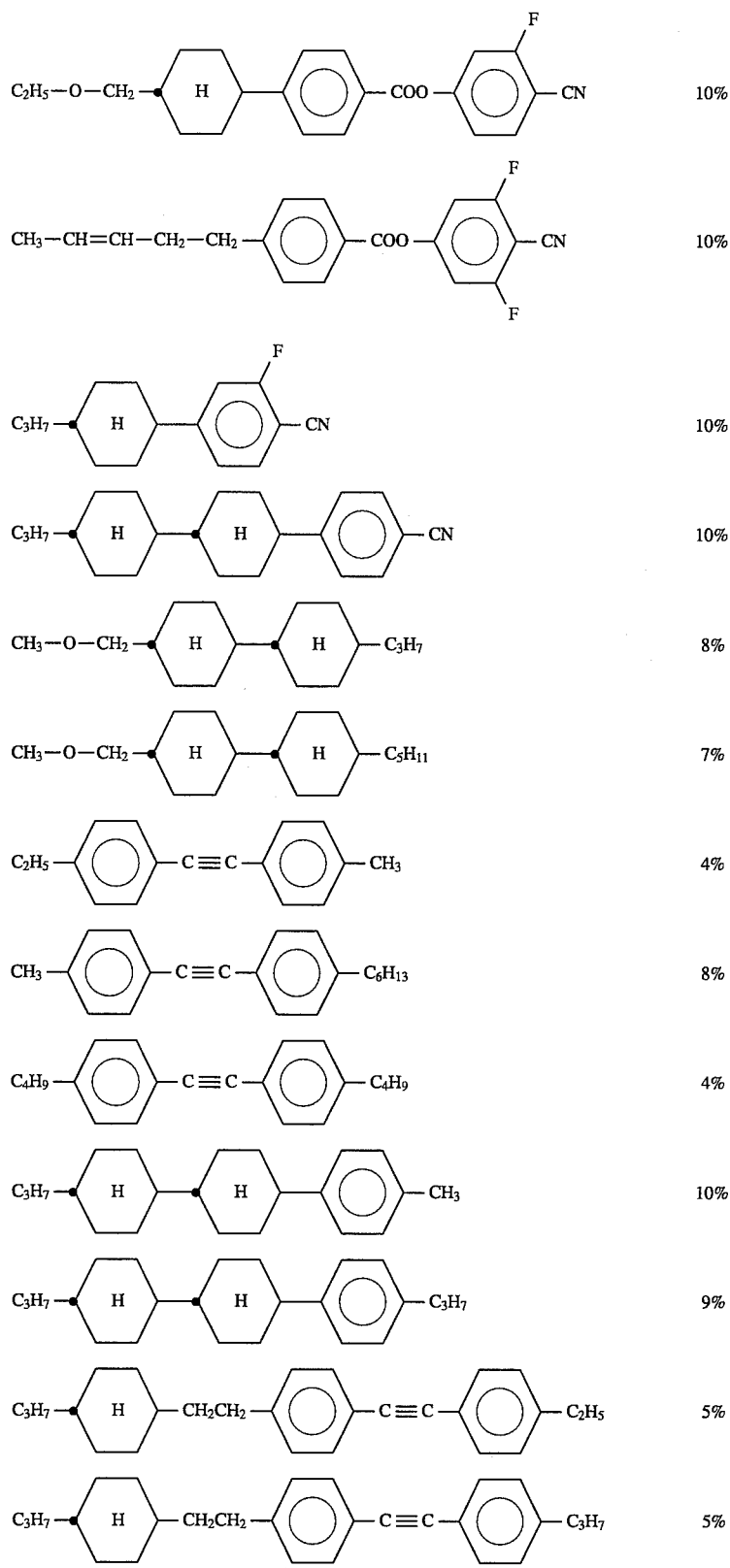

| | |
|---|---|
| C₂H₅—O—CH₂—[H]—◯—COO—◯(F)—CN | 10% |
| CH₃—CH=CH—CH₂—CH₂—◯—COO—◯(F,F)—CN | 10% |
| C₃H₇—[H]—◯(F)—CN | 10% |
| C₃H₇—[H]—[H]—◯—CN | 10% |
| CH₃—O—CH₂—[H]—[H]—C₃H₇ | 8% |
| CH₃—O—CH₂—[H]—[H]—C₅H₁₁ | 7% |
| C₂H₅—◯—C≡C—◯—CH₃ | 4% |
| CH₃—◯—C≡C—◯—C₆H₁₃ | 8% |
| C₄H₉—◯—C≡C—◯—C₄H₉ | 4% |
| C₃H₇—[H]—[H]—◯—CH₃ | 10% |
| C₃H₇—[H]—[H]—◯—C₃H₇ | 9% |
| C₃H₇—[H]—CH₂CH₂—◯—C≡C—◯—C₂H₅ | 5% |
| C₃H₇—[H]—CH₂CH₂—◯—C≡C—◯—C₃H₇ | 5% |

This liquid crystal composition exhibited clearing point: 80.7° C., viscosity at 20° C.: 26.0 mPa.s; optical anisotropy at 25° C.: 0.145, threshold voltage: 1.37 V, and δ=0.24 (%/°C.), Example 3

A liquid crystal composition consisting of the following compounds was prepared:

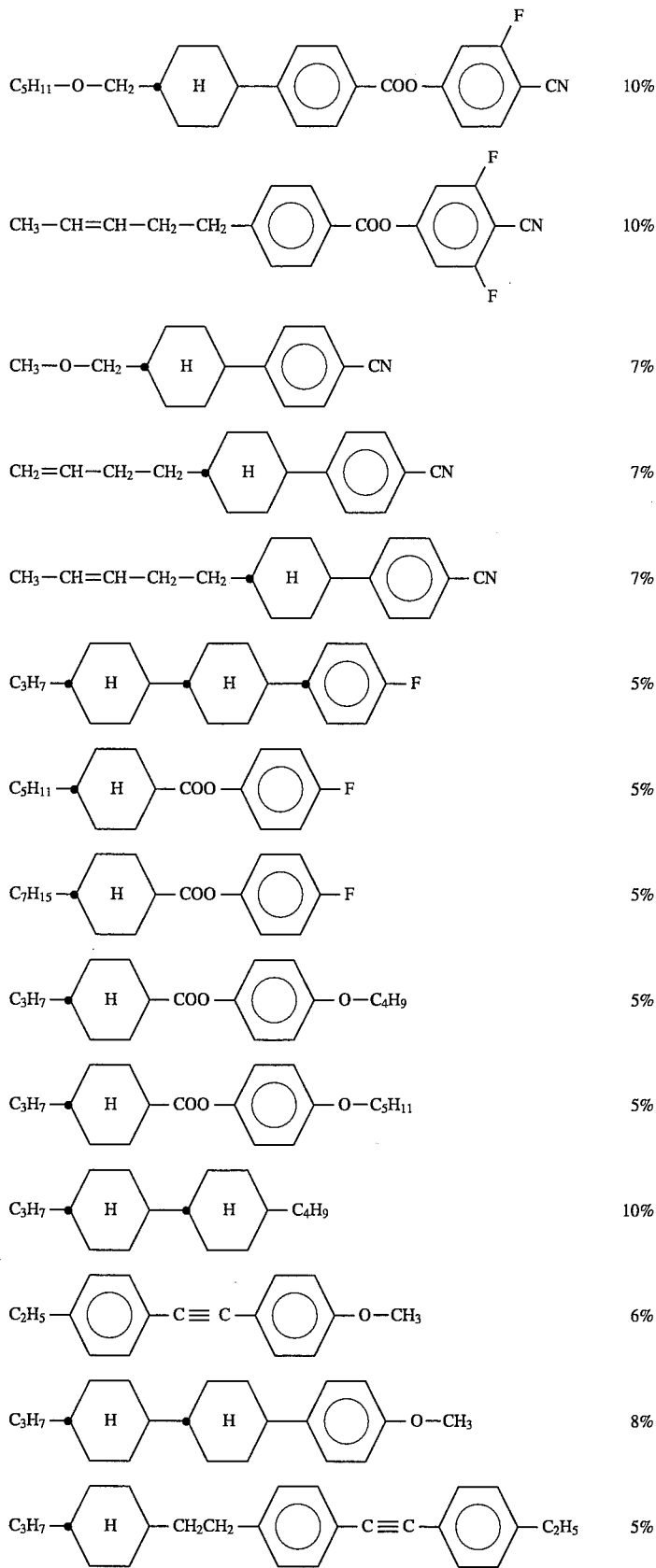

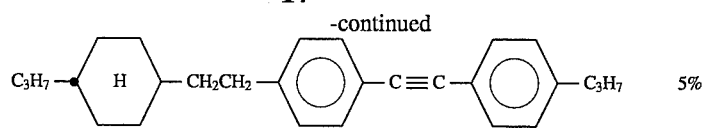   5%
This liquid crystal composition exhibited clearing point: 75.8° C.; viscosity at 20° C.; 26.0 mPa.s, optical anisotoropy at 25° C.: 0,130, threshold voltage: 1.35 V, and δ=0.25 (%/°C.).
Example 4
A liquid crystal composition consisting of the following compounds was prepared:
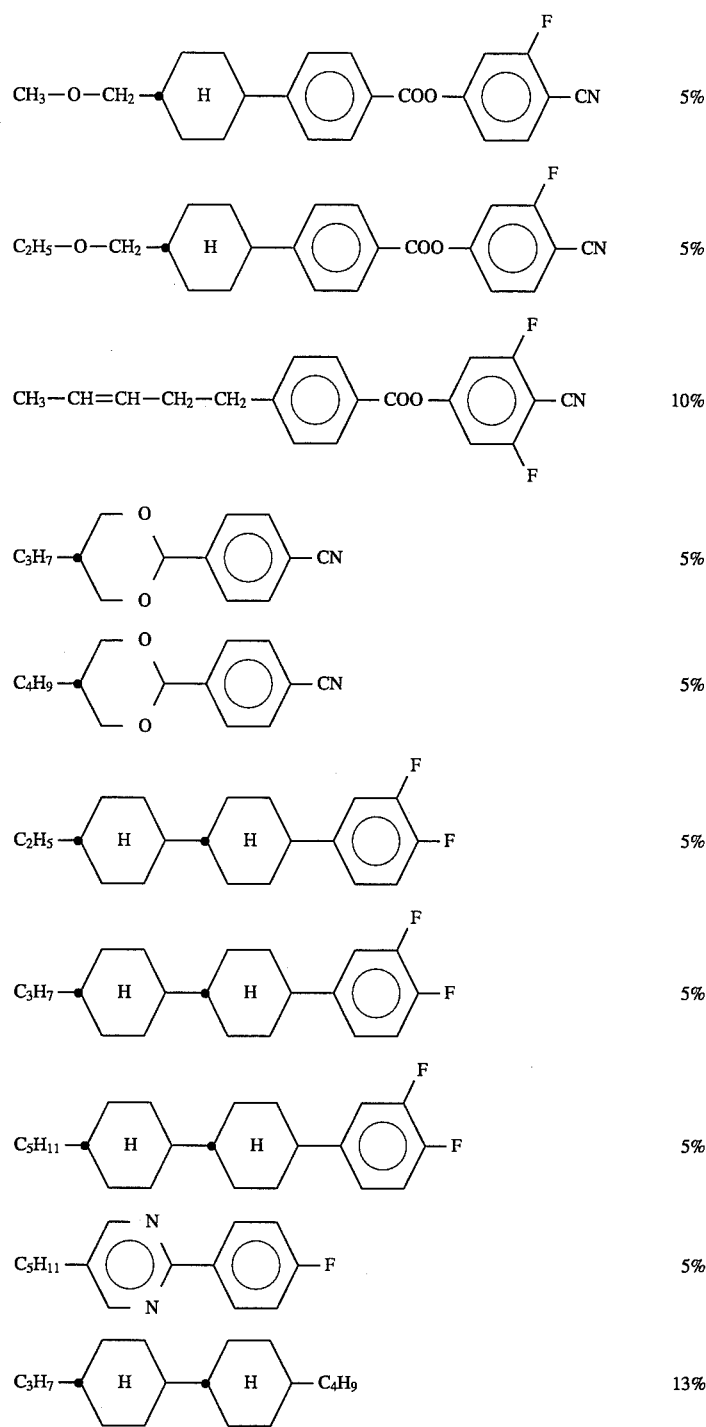

-continued
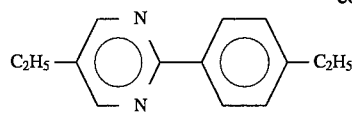 4%
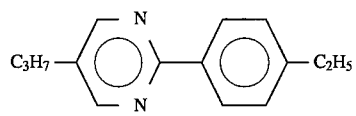 4%
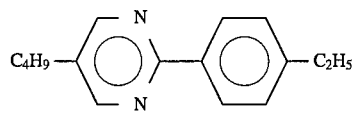 4%
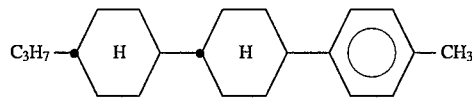 10%
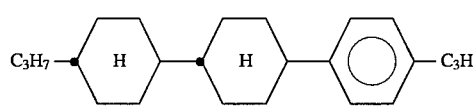 5%
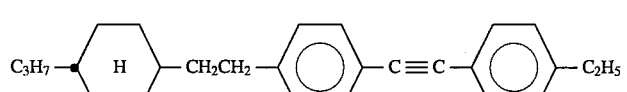 5%
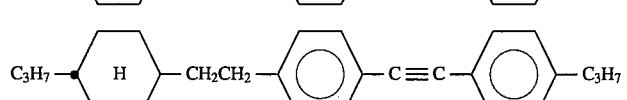 5%
This liquid crystal composition exhibited clearing point: 80.9° C., viscosity at 20° C.: 26.0 mPa.s, optical anisotropy at 25° C.: 0.126, threshold voltage: 1.33 V, and δ=0.28 (%/°C.).
Example 5
A liquid crystal composition consisting of the following compounds was prepared:
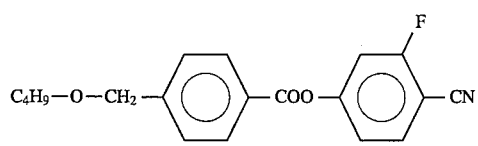 10%
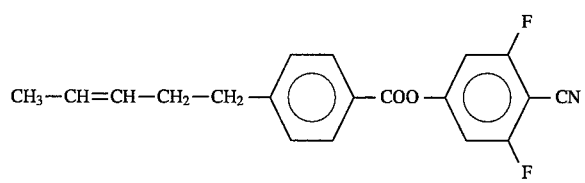 10%
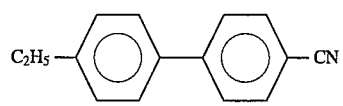 8%
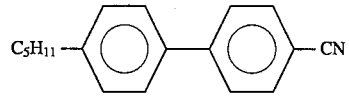 7%
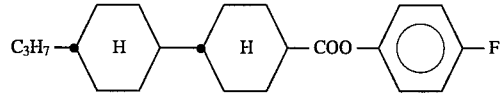 5%

-continued
 5%
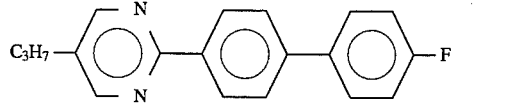 8%
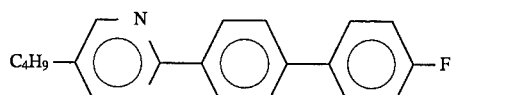 7%
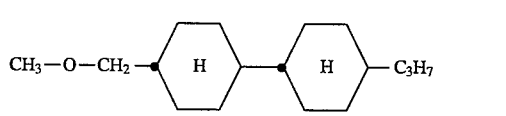 8%
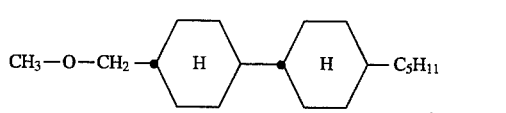 7%
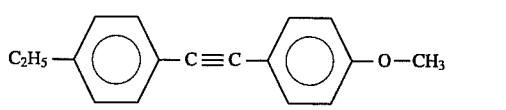 5%
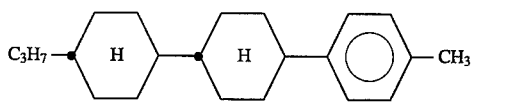 10%
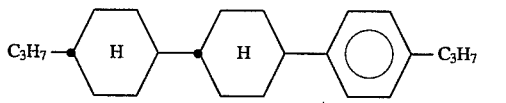 10%
This liquid crystal composition exhibited a clearing point of 86.0° C., viscosity at 20° C. of 39.0 mPa.s, an optical anisotropy at 25° C. of 0,156, a threshold voltage of 1.37 V and a δ of 0.39 (%/°C.).
Example 6
A liquid crystal composition consisting of the following compounds was prepared:
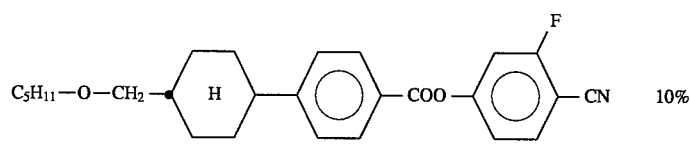 10%
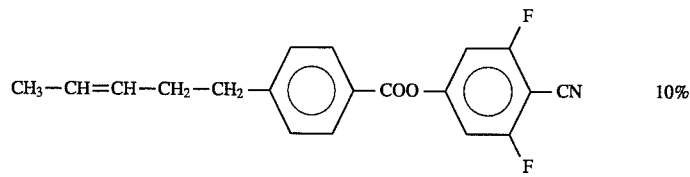 10%
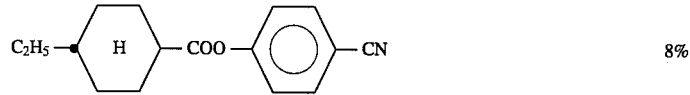 8%
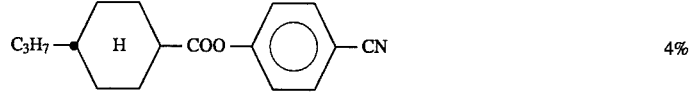 4%

-continued
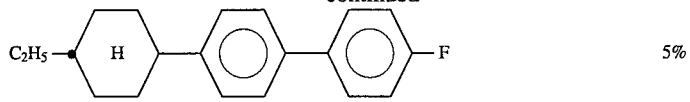 5%
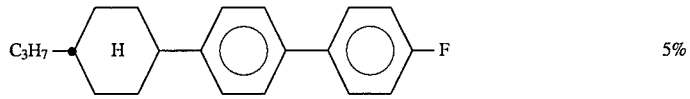 5%
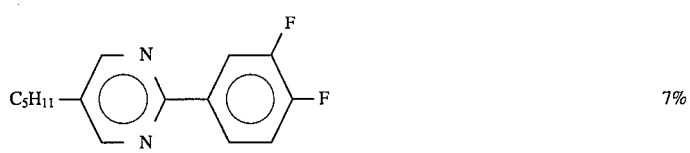 7%
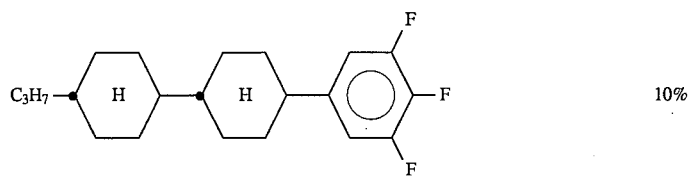 10%
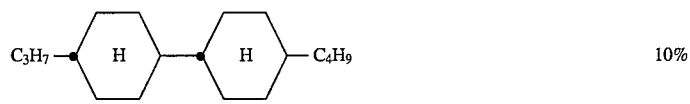 10%
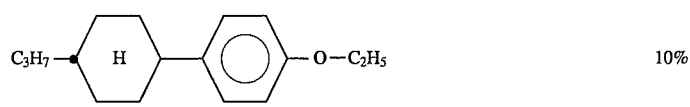 10%
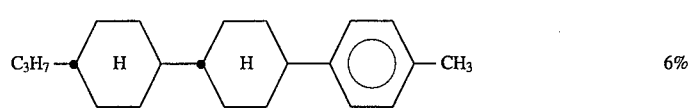 6%
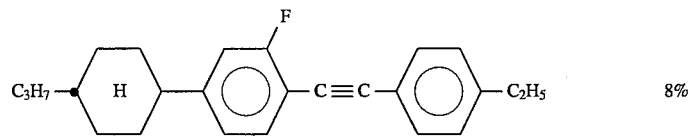 8%
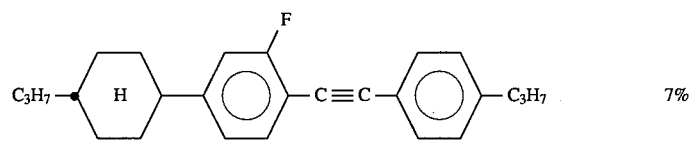 7%
This liquid crystal composition exhibited a clearing clearing point of 77.8° C., a viscosity at 20° C. of 31.0 mPa.s, an optical anisotropy at 25° C. of 0,140, a threshold voltage of 1.17 V and a δ of 0.26 (%/°C.).
Example 7
A liquid crystal composition consisting of the following compounds was prepared:
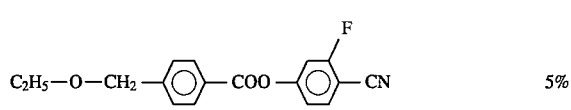 5%
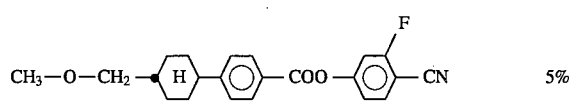 5%
-continued
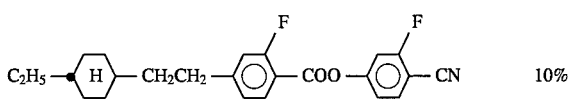 10%
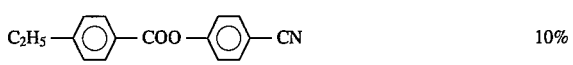 10%
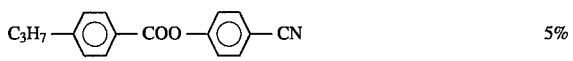 5%
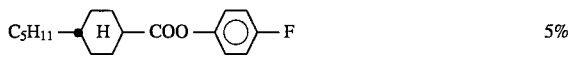 5%
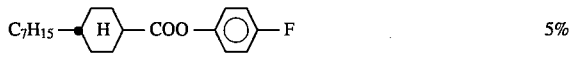 5%

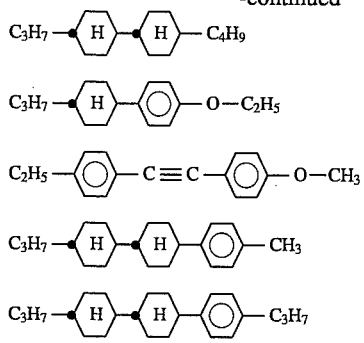10%
8%
7%
10%
10%
5%
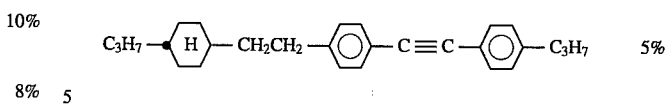 5%
This liquid crystal composition exhibited a clearing point of 89.6° C., a viscosity at 20° C. of 26.5 mPa.s, an optical anisotropy at 25° C. of 0.142, a threshold voltage of 1.49 V and a δ of 0.21 (%/°C.).
Example 8
A liquid crystal composition consisting of the following compounds was prepared:
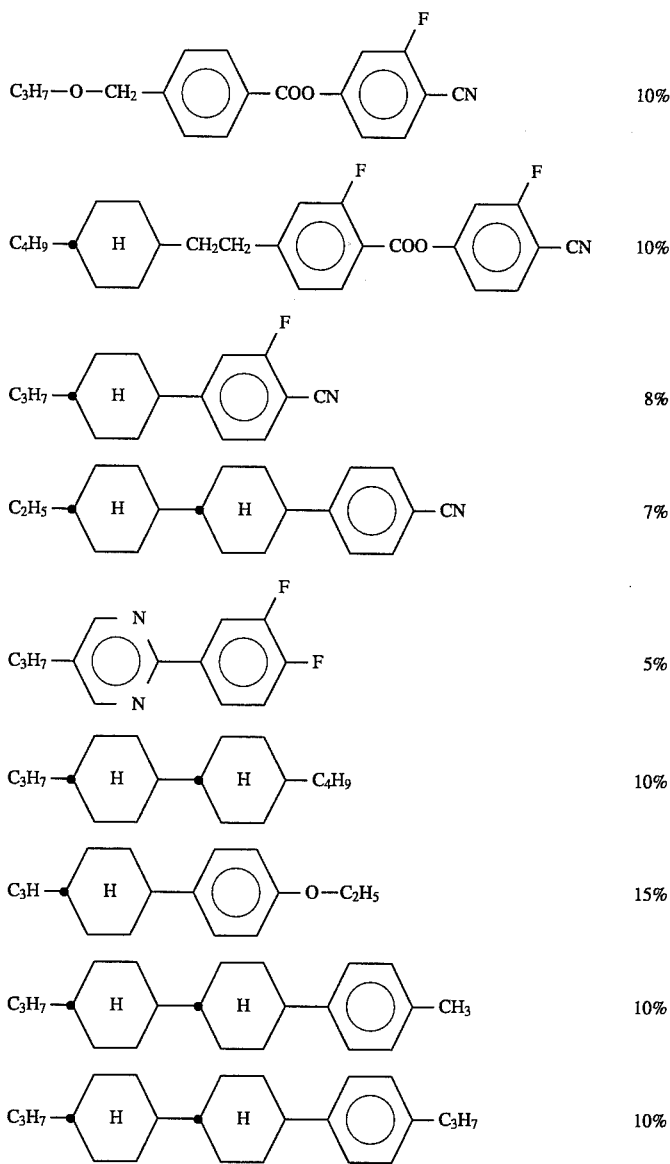
10%
10%
8%
7%
5%
10%
15%
10%
10%

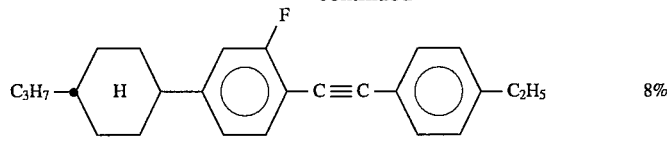 8%
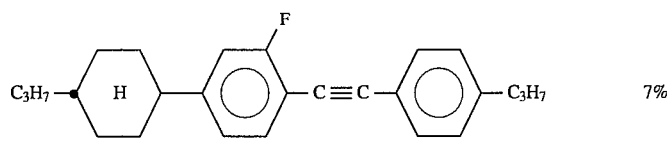 7%
This liquid crystal composition exhibited a clearing point of 92.9° C., a viscosity at 20° C. of 21.9 mPa.s, an optical anisotropy at 25° C. of 0,131, a threshold voltage of 1.68 V and a δ of 1.8 (%/°C.).
Example 9
A liquid crystal composition consisting of the following compounds was prepared:
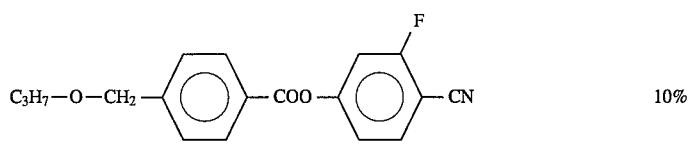 10%
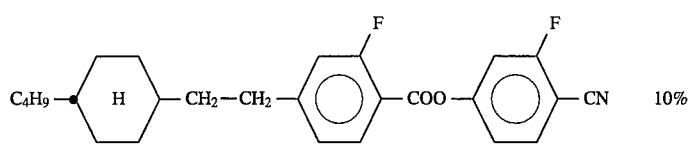 10%
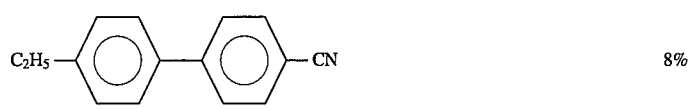 8%
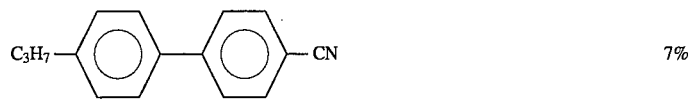 7%
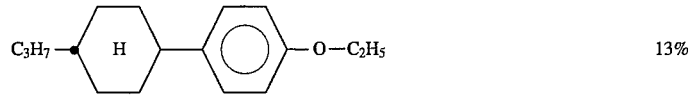 13%
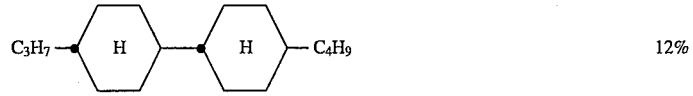 12%
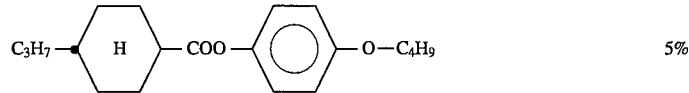 5%
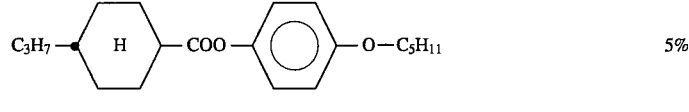 5%
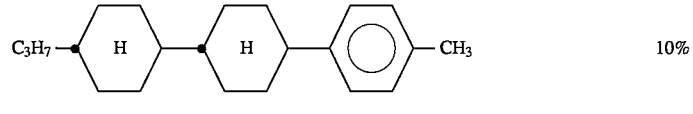 10%
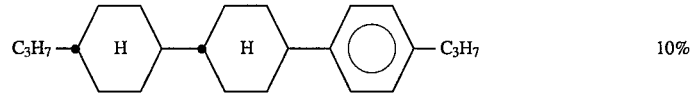 10%

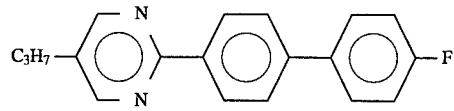 5%
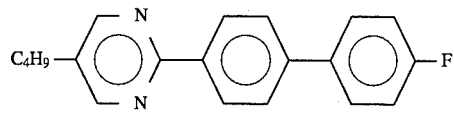 5%
This liquid crystal composition exhibited a clearing point of 82.7° C., a viscosity at 20° C. of 26.5 mPa.s, an optical anisotropy at 25° C. of 0,134, a threshold voltage of 1.58 V and a δ of 0.32 (%/°C.).
Example 10
A liquid crystal composition consisting of the following compounds was prepared:
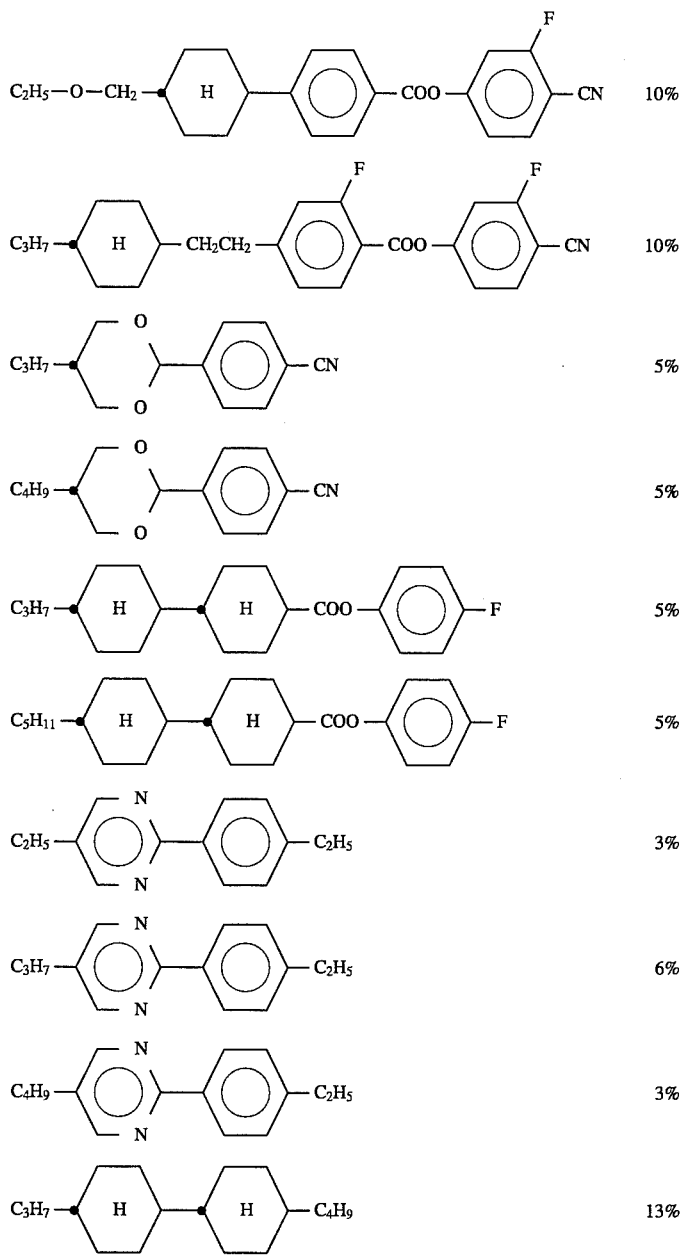

-continued

| Structure | % |
|---|---|
| C₃H₇—[H]—◯—O—C₂H₅ | 10% |
| C₃H₇—[H]—[H]—◯—CH₃ | 10% |
| C₃H₇—[H]—◯(F)—C≡C—◯—C₂H₅ | 8% |
| C₃H₇—[H]—◯(F)—C≡C—◯—C₃H₇ | 7% |

This liquid crystal composition exhibited a clearing point of 84.3° C., a viscosity at 20° C. of 23.4 mPa.s, an optical anisotropy at 25° C. of 0,133, a threshold voltage at 25° C. of 1.56 V and a δ of 0.27 (%/°C.).

Example 11

A liquid crystal composition consisting of the following compounds was prepared:

| Structure | % |
|---|---|
| C₄H₉—O—CH₂—◯—COO—◯(F)—CN | 8% |
| CH₃—O—CH₂—[H]—◯—COO—◯(F)—CN | 5% |
| C₃H₇—[H]—CH₂—CH₂—◯(F)—COO—◯(F)—CN | 7% |
| C₃H₇—[H]—◯—CN | 8% |
| CH₃—O—CH₂—[H]—◯—CN | 7% |
| C₃H₇—[H]—[H]—◯(F,F,F) | 10% |
| C₂H₅—[H]—◯—◯—F | 5% |
| C₃H₇—[H]—◯—◯—F | 5% |
| CH₃—O—CH₂—[H]—[H]—C₃H₇ | 8% |
| CH₃—O—CH₂—[H]—[H]—C₅H₁₁ | 7% |
| C₃H₇—[H]—[H]—◯—C₅H₇ | 14% |
| C₂H₅—◯—C≡C—◯—CH₃ | 4% |
| CH₃—◯—C≡C—◯—C₆H₁₃ | 8% |
| C₄H₉—◯—C≡C—◯—C₄H₉ | 4% |

This liquid crystal composition exhibited a clearing point of 70.0° C., a viscosity at 20° C. of 24.3 mPa.s, an optical anisotropy at 25° C. of 0,127 and a threshold voltage of 1.40 V.

Example 12

A liquid crystal composition consisting of the following compounds was prepared:

| Structure | % |
|---|---|
| C₅H₁₁—O—CH₂—[H]—◯—COO—◯(F)—CN | 7% |

-continued

| Structure | % |
|---|---|
| C₃H₇–[H]–CH₂–CH₂–⟨2-F-phenyl⟩–COO–⟨3-F-4-CN-phenyl⟩ | 8% |
| CH₂=CH–CH₂–CH₂–[H]–⟨phenyl⟩–CN | 5% |
| CH₃–CH=CH–CH₂–CH₂–[H]–⟨phenyl⟩–CN | 5% |
| C₅H₁₁–⟨pyrimidine⟩–⟨4-F-phenyl⟩ | 8% |
| C₃H₇–[H]–[H]–⟨4-F-phenyl⟩ | 5% |
| C₂H₅–[H]–[H]–⟨3-F-4-CN-phenyl⟩ | 10% |
| C₂H₅–[H]–[H]–⟨3,4-diF-phenyl⟩ | 5% |
| C₃H₇–[H]–[H]–⟨3,4-diF-phenyl⟩ | 5% |
| C₅H₁₁–[H]–[H]–⟨3,4-diF-phenyl⟩ | 5% |
| C₃H₇–[H]–[H]–C₄H₉ | 11% |
| C₂H₅–⟨phenyl⟩–C≡C–⟨phenyl⟩–CH₃ | 4% |
| CH₃–⟨phenyl⟩–C≡C–⟨phenyl⟩–C₆H₁₃ | 8% |
| C₄H₉–⟨phenyl⟩–C≡C–⟨phenyl⟩–C₄H₉ | 4% |

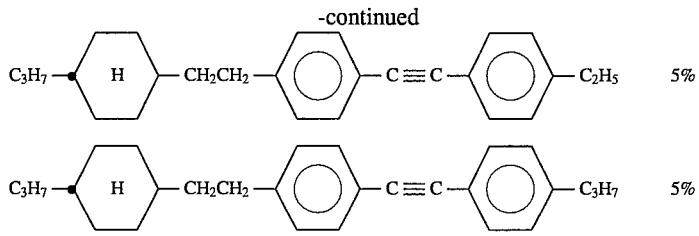

This liquid crystal composition exhibited a clearing point of 84.6° C., a viscosity at 20° C. of 24.1 mPa.s, an optical anisotropy at 25° C. of 0.143 and a threshold voltage of 1.63 V. (Effectiveness of the Invention)

As apparent from Comparative example and Examples, the liquid crystal composition of the present invention has the threshold voltage and its temperature-dependency reduced; hence when it is used, it is possible to prepare a liquid crystal display element effecting a low voltage drive and a low power consumption and also scarce occurrence of display inferiority, etc. such as poor contrast even at the temperature range in use.

What we claim is:

1. A liquid crystal composition comprising a first component consisting of at least one member of compounds expressed by the formula (I):

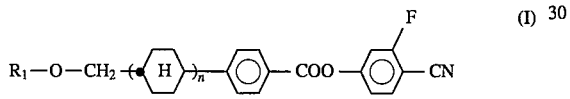 (I)

wherein $R_1$ represents an alkyl group of 1 to 8 carbon atoms and n represents 0 or 1;

a second component consisting of at least one member of compounds expressed by the formula (II-1) or the formula (II-2):

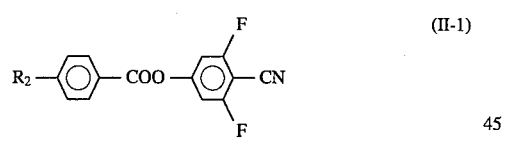 (II-1)

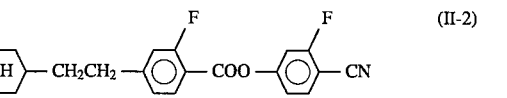 (II-2)

wherein $R_2$ represents an alkenyl group of 2 to 8 carbon atoms and $R_0$ represents an alkyl group of 1 to 8 carbon atoms;

a third component consisting of at least one member of compounds expressed by the formula (III), formula (IV) or formula (V):

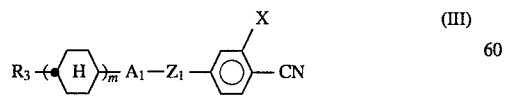 (III)

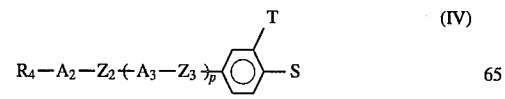 (IV)

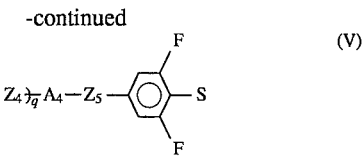 (V)

wherein, in the formula (III), $R_3$ represents an alkyl group of 1 to 8 carbon atoms wherein one $CH_2$ group may be replaced by oxygen atom or —CH=CH— group; m represents 0 or 1; $A_1$ represents trans-1,4-cyclohexylene, 1,4-phenylene or trans-1,3-dioxane-2,5-diyl; $Z_1$ represents —COO— or single bond; and X represents F or H, with a proviso that when $Z_1$, represents —COO—, then X represents H, in the formula (IV), $R_4$ represents an alkyl group of 1 to 8 carbon atoms; p represents 0 or 1; $A_2$ represents trans-1,4-cyclohexylene, 1,4-phenylene or pyrimidin-2,5-diyl; A3 represents trans-1,4-cyclohexylene or 1,4-phenylene; $Z_2$ represents —$CH_2CH_2$—, —CH=CH— or a single bond; $Z_3$ represents —COO— or a single bond; T represents F or H; S represents F or Cl, in the formula (V), $R_2$ represents an alkyl group of 1 to 8 carbon atoms; q represents 0 or 1; $A_4$ represents trans-1,4-cyclohexylene or 1,4-phenylene; $Z_4$ represents —$CH_2CH_2$—, —CH=CH— or single bond; $Z_5$ represents —$CH_2CH_2$— or a single bond; and S represents F or Cl, and a fourth component consisting of at least one member of compounds expressed by the formulas (VI) or (VII):

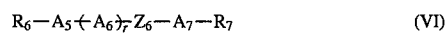 (VI)

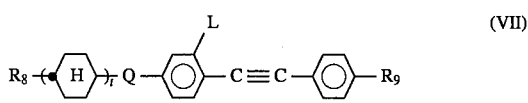 (VII)

wherein, in the formula (VI), $R_6$ represents an alkyl group of 1 to 8 carbon atoms; $R_7$ represents an alkyl group or an alkoxy group each of 1 to 8 carbon atoms or an alkoxymethyl group of 2 to 8 carbon atoms; r represents 0 or 1; $A_5$ represents trans-1,4-cyclohexylene, 1,4-phenylene or pyrimidin-2,5-diyl; $A_6$ and $A_7$ each independently represent trans-1,4-cyclohexylene or 1,4-phenylene; and $Z_6$ represents —COO— or single bond, and in the formula (VII), $R_8$ and $R_9$ represent an alkyl group of 1 to 8 carbon atoms; Q represents single bond or —$CH_2CH_2$—; L represents F or H; and t represents 0 or 1.

2. A liquid crystal composition according to claim 1, wherein the compound expressed by the formula (III) as the third component is expressed by the following formula (IIIA):

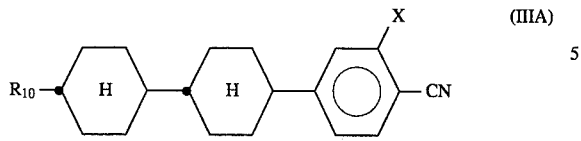

wherein
$R_{10}$ represents an alkyl group of 1 to 8 carbon atoms and X represents F or H.

3. A liquid crystal composition according to claim 1, wherein the compound expressed by the formula (VI) as the fourth compent is a compound expressed by the following formula (VIA):

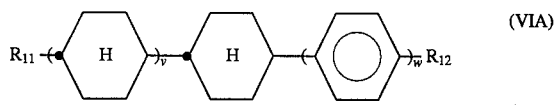

wherein
$R_{11}$ represents an alkyl group of 1 to 8 carbon atoms; $R_{12}$ represents an alkyl group or an alkoxy group each of 1 to 8 carbon atoms or an alkoxymethyl group of to 8 carbon atoms; v and w each independently represents 0 or 1, with a proviso that when either one of v and w represents 0, then the other one represents 1.

4. A liquid crystal composition according to claim 2, wherein the compound expressed by the formula (VI) as the fourth compent is a compound expressed by the following formula (VIA):

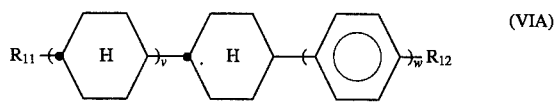

wherein
$R_{11}$ represents an alkyl group of 1 to 8 carbon atoms; $R_{12}$ represents an alkyl group or an alkoxy group each of 1 to 8 carbon atoms or an alkoxymethyl group of to 8 carbon atoms; v and w each independently represents 0 or 1, with a proviso that when either one of v and w represents 0, then the other one represents 1.

5. A liquid crystal composition according to claim 1, wherein the respective mixing proportions of the first, second, third and fourth components are 3 to 50%, 3 to 50%, 10 to 50% and 10 to 50%; each by weight, based upon the total weight of the first to fourth components.

6. A liquid crystal composition according to claim 1, wherein the respective mixing proportions of the first, second, third and fourth components are 5 to 30%, 5 to 30%, 20 to 40% and 20 to 40%; each by weight, based upon the total weight of the first to fourth components.

7. A liquid crystal composition according to claim 2, wherein the respective mixing proportions of the first, second, third and fourth components are 3 to 50%, 3 to 50%, 10 to 50% and 10 to 50%; each by weight, based upon the total weight of the first to fourth components.

8. A liquid crystal composition according to claim 2, wherein the respective mixing proportions of the first, second, third and fourth components are 5 to 30%, 5 to 30%, 20 to 40% and 20 to 40%; each by weight, based upon the total weight of the first to fourth components.

9. A liquid crystal composition according to claim 3, wherein the respective mixing proportions of the first, second, third and fourth components are 3 to 50%, 3 to 50%, 10 to 50% and 10 to 50%; each by weight, based upon the total weight of the first to fourth components.

10. A liquid crystal composition according to claim 3, wherein the respective mixing proportions of the first, second, third and fourth components are 5 to 30%, 5 to 30%, 20 to 40% and 20 to 40%; each by weight, based upon the total weight of the first to fourth components.

11. A liquid crystal composition according to claim 4, wherein the respective mixing proportions of the first, second, third and fourth components are 3 to 50%, 3 to 50%, 10 to 50% and 10 to 50%; each by weight, based upon the total weight of the first to fourth components.

12. A liquid crystal composition according to claim 4, wherein the respective mixing proportions of the first, second, third and fourth components are 5 to 30%, 5 to 30%, 20 to 40% and 20 to 40%; each by weight, based upon the total weight of the first to fourth components.

13. An electrooptical display element comprising a liquid crystal composition set forth in claim 1.

* * * * *